US010997246B2

(12) United States Patent
Perkins et al.

(10) Patent No.: US 10,997,246 B2
(45) Date of Patent: *May 4, 2021

(54) MANAGING AND AUTOMATICALLY LINKING DATA OBJECTS

(71) Applicant: Ab Initio Technology LLC, Lexington, MA (US)

(72) Inventors: Timothy Perkins, Somerville, MA (US); Alan Morse, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 336 days.

This patent is subject to a terminal disclaimer.

(21) Appl. No.: 15/936,725

(22) Filed: Mar. 27, 2018

(65) Prior Publication Data
US 2018/0210967 A1 Jul. 26, 2018

Related U.S. Application Data

(63) Continuation of application No. 15/099,204, filed on Apr. 14, 2016, now Pat. No. 9,959,366, which is a
(Continued)

(51) Int. Cl.
*G06F 16/90* (2019.01)
*G06F 16/901* (2019.01)
(Continued)

(52) U.S. Cl.
CPC ........ *G06F 16/9024* (2019.01); *G06F 3/0482* (2013.01); *G06F 3/04842* (2013.01); *G06F 16/90* (2019.01)

(58) Field of Classification Search
None
See application file for complete search history.

(56) References Cited

U.S. PATENT DOCUMENTS 5,734,866 A 3/1998 Grosse et al.
5,930,802 A 7/1999 Lee
(Continued)

FOREIGN PATENT DOCUMENTS

JP H08-147317 6/1996
JP 2000-082039 3/2000
WO WO2007/117643 10/2007

OTHER PUBLICATIONS

U.S. Appl. No. 61/114,032, filed Nov. 12, 2008, Perkins et al.
(Continued)

*Primary Examiner* — Belix M Ortiz Ditren
(74) *Attorney, Agent, or Firm* — Fish & Richardson P.C.

(57) ABSTRACT

A computer-implemented method for managing data objects stored in a data repository and displaying elements associated with data objects on a graphical user interface is presented. The method includes using reusable logic to provide at least one displayed input element associated with a first data object stored in the data repository. In response to user input associated with the displayed input element, the method includes generating a second data object stored in the data repository, and linking the second data object with one or more related data objects in the data repository automatically based on the data object associated with the displayed element.

72 Claims, 10 Drawing Sheets

Related U.S. Application Data continuation of application No. 12/617,422, filed on Nov. 12, 2009, now Pat. No. 9,317,624.

(60) Provisional application No. 61/114,032, filed on Nov. 12, 2008.

(51) Int. Cl.
*G06F 3/0482* (2013.01)
*G06F 3/0484* (2013.01)

(56) References Cited

U.S. PATENT DOCUMENTS

| | | | |
|---|---|---|---|
| 6,065,002 A * | 5/2000 | Knotts | G06F 16/252 |
| 6,609,132 B1 | 8/2003 | White et al. | |
| 6,973,619 B1 | 12/2005 | Hirose et al. | |
| 7,792,868 B2 | 9/2010 | Finkelstein | |
| 8,004,541 B2 * | 8/2011 | Mercer | G06F 9/451 |
| | | | 345/646 |
| 8,069,129 B2 | 11/2011 | Gould et al. | |
| 8,650,150 B2 | 2/2014 | Zhao | |
| 9,519,418 B2 * | 12/2016 | Tuli | G06F 3/04883 |
| 9,959,366 B2 | 5/2018 | Perkins | |
| 2004/0034848 A1 | 2/2004 | Moore et al. | |
| 2005/0038764 A1 | 2/2005 | Minsky | |
| 2005/0257193 A1 | 11/2005 | Falk et al. | |
| 2006/0117067 A1 | 6/2006 | Wright et al. | |
| 2007/0022405 A1 | 1/2007 | Bray | |
| 2007/0038666 A1* | 2/2007 | Meijer | G06F 9/4492 |
| 2007/0094199 A1 | 4/2007 | Deshpande et al. | |
| 2007/0112745 A1 | 5/2007 | Dettinger et al. | |
| 2007/0239802 A1 | 10/2007 | Razdow et al. | |
| 2009/0043803 A1 | 2/2009 | Frishberg et al. | |
| 2010/0121890 A1 | 5/2010 | Perkins et al. | |
| 2016/0299993 A1 | 10/2016 | Perkins et al. | |

OTHER PUBLICATIONS

U.S. Appl. No. 12/617,422, filed Nov. 12, 2009, Perkins et al.
U.S. Appl. No. 15/099,204, filed Apr. 14, 2016, Perkins et al.
Examination Report issued in IN 3296/CHENP/2011 dated Oct. 29, 2018.
Gunelius, Susan, "What are Blog Comments?: The Importance of Blog Comments to Bloggers." About.com—Blogging, accessed online <http://weblogs.about.com/od/partsofablog/qt/BlogComments.htm> 1 page.
Horridge, Matthew et al., "A Practical Guide to Building OWL Ontologies Using the Protégé-OWL Plugin and CO-ODE Tools Edition 1.0," University of Manchester, Aug. 27, 2004, 84 pages.
International Search Report & Written Opinion issued in PCT application No. PCT/US09/64211, dated Jan. 12, 2010, 8 pages.
Japanese Office Action, with English translation, JP Application No. 2011-536466, dated Dec. 24, 2013, 6 pages.
"Stud.IP Dokumentation," accessed online <http://hilfe.studip.de/index.php/Basis/DateienUpload?setlang=en> Apr. 17, 2012, 2 pages.
Supplementary European Search Report, EP09826753, dated Mar. 27, 2012, 8 pages.
ProtégéOWL API Programmer's Guide, Jul. 15, 2008, pp. 121.
Examination Report in Canadian Application No. 2,743,151, dated Jul. 11, 2016 (4 pages).
Examination Report issued in Australian Patent Application No. 2016202060, dated Oct. 3, 2017.
CA Office Action in Canadian Appln. No. 3,042,068, dated Oct. 8, 2020, 3 pages.

* cited by examiner

FIG. 5

| EME NAME | RULESET NAME | | | | SHORT DESCRIPTION |
|---|---|---|---|---|---|
| POE_CQ | POE_CQ | Promote Ruleset | Demote Ruleset | New Minor Version | New Major Version | |
| POE_CQ | POE_CQ | Promote Ruleset | Demote Ruleset | New Minor Version | New Major Version | |
| POE_CQ | POE_CQ | Promote Ruleset | Demote Ruleset | New Minor Version | New Major Version | |
| POE_CQ | POE_CQ | Promote Ruleset | Demote Ruleset | New Minor Version | New Major Version | Yet another |
| POE_CQ | POE_CQ | Promote Ruleset | Demote Ruleset | New Minor Version | New Major Version | Yet another |
| POE_CQ | POE_CQ | Promote Ruleset | Demote Ruleset | New Minor Version | New Major Version | Yet another |
| POE_CQ | POE_CQ | Promote Ruleset | Demote Ruleset | New Minor Version | New Major Version | Yet another |
| POE_CQ | POE_CQ | Promote Ruleset | Demote Ruleset | New Minor Version | New Major Version | |

502 Promote Ruleset
504 Demote Ruleset
506 New Minor Version
508 New Major Version Project: POE_CQ
Description Rulesets 10 items

FIG. 6

MANAGING AND AUTOMATICALLY LINKING DATA OBJECTS

CROSS-REFERENCE TO RELATED APPLICATIONS

This application is a continuation of U.S. patent application Ser. No. 15/099,204, filed Apr. 14, 2016, which is a continuation of U.S. patent application Ser. No. 12/617,422 (U.S. Pat. No. 9,317,624), filed on Nov. 12, 2009, which claims priority to U.S. provisional patent application 61/114,032, filed on Nov. 12, 2008. The entire contents of each of the above applications are hereby incorporated by reference.

BACKGROUND

The description relates to managing and automatically linking data objects in a scalable object oriented database system.

Conventional data entry systems have been realized as Web applications, such that a user is allowed to generate new objects by clicking on a link. Such a link may direct the user to a web page listing the types of objects that could be generated. The user would then select a link for the type of object and be taken to an editor for a newly generated, empty object. The user would then fill in the necessary information about the new object, including links to existing objects. Setting these links to existing objects often required extensive navigation to find the link target or looking through a long list of existing objects.

Custom applications built within Lotus Notes are similar at least in terms of defining a custom interface where new objects ("documents") are generated, and sometimes linked to other documents. A discussion forum interface would be another example where a new object or a response is generated from and linked to a previously existing object, the previous message.

SUMMARY

In one aspect, in general, the description features a method for managing data objects stored in a data repository and displaying elements associated with data objects on a graphical user interface. The method includes: using reusable logic to provide least one displayed input element associated with a first data object stored in the data repository; in response to user input associated with the displayed input element, generating a second data object stored in the data repository; and linking the second data object with one or more related data objects in the data repository automatically based on the data object associated with the displayed element.

Aspects can include one or more of the following features.

Linking the second data object with one or more related data objects in the data repository automatically based on the data object associated with the displayed element includes linking the second data object with the first data object.

Linking the second data object with one or more related data objects in the data repository automatically based on the data object associated with the displayed element includes linking the second data object with at least one data object related to the first data object through one or more relational links.

The method further includes displaying on the graphical user interface one or more elements associated with one or more data objects stored in the data repository related to the second object through one or more relational links.

The one or more elements associated with the one or more data objects include elements displaying information about which data objects are related to the first data object.

The information includes information about the second data object.

The one or more elements associated with the one or more data objects include input elements for receiving information from a user.

The input elements provide a set of choices from which the user selects to provide the information.

The set of choices is based on the one or more data objects stored in the data repository related to the second object through one or more relational links.

The graphical user interface provides a browser page including the one or more elements associated with the one or more data objects.

The reusable logic is reused to provide at least one displayed input element associated with a third data object stored in the data repository.

The reusable logic is used by a renderer to provide the displayed input element associated with the first data object and the displayed input element associated with the first data object to be rendered on a browser page.

The user input associated with the displayed input element includes a user interaction with the displayed input element.

The method may further include, in response to user input associated with the displayed input element, generating a third data object for storing in the data repository.

A series of screens may be used to collect the user input to generate the second data object.

The first data object may be associated with a dedicated editor.

In another aspect, in general, a computer-readable medium stores a computer program for managing data objects stored in a data repository and displaying elements associated with data objects on a graphical user interface, the computer program including instructions for causing a computer system to: use reusable logic to provide at least one displayed input element associated with a first data object stored in the data repository; in response to user input associated with the displayed input element, generate a second data object stored in the data repository; and link the second data object with one or more related data objects in the data repository automatically based on the data object associated with the displayed element.

In another aspect, in general, a system is provided for managing data objects stored in a data repository and displaying elements associated with data objects on a graphical user interface. The system includes a data storage system providing a data repository storing data objects; at least one output device or port for providing a graphical user interface; and a computer system coupled to the data storage system and the at least one output device or port, including circuitry to use reusable logic to provide at least one displayed input element associated with a first data object stored in the data repository, in response to user input associated with the displayed input element, generate a second data object stored in the data repository, and link the second data object with one or more related data objects in the data repository automatically based on the data object associated with the displayed element.

In another aspect, in general, a system is provided for managing data objects stored in a data repository and displaying elements associated with data objects on a graphical user interface. The system includes means for using reusable logic to provide at least one displayed input element associated with a first data object stored in the data repository; means for generating a second data object stored in the data repository in response to user input associated with the displayed input element; and means for linking the second data object with one or more related data objects in the data repository automatically based on the data object associated with the displayed element.

Aspects can have one or more of the following advantages.

It is advantageous to automatically generate and link richly interconnected metadata in a data repository and support custom workflows that use the data repository as their backing datastore. Further, metadata applications can be built out of the data repository itself.

Other features and advantages of the description will become apparent from the following description, and from the claims.

DESCRIPTION OF DRAWINGS

FIG. 5 illustrates a screenshot of generating, displaying and linking data objects stored in a business rule environment.

FIGS. 6 and 7 illustrate a series of wizard screens.

DESCRIPTION

1 System Overview

Figure 1:
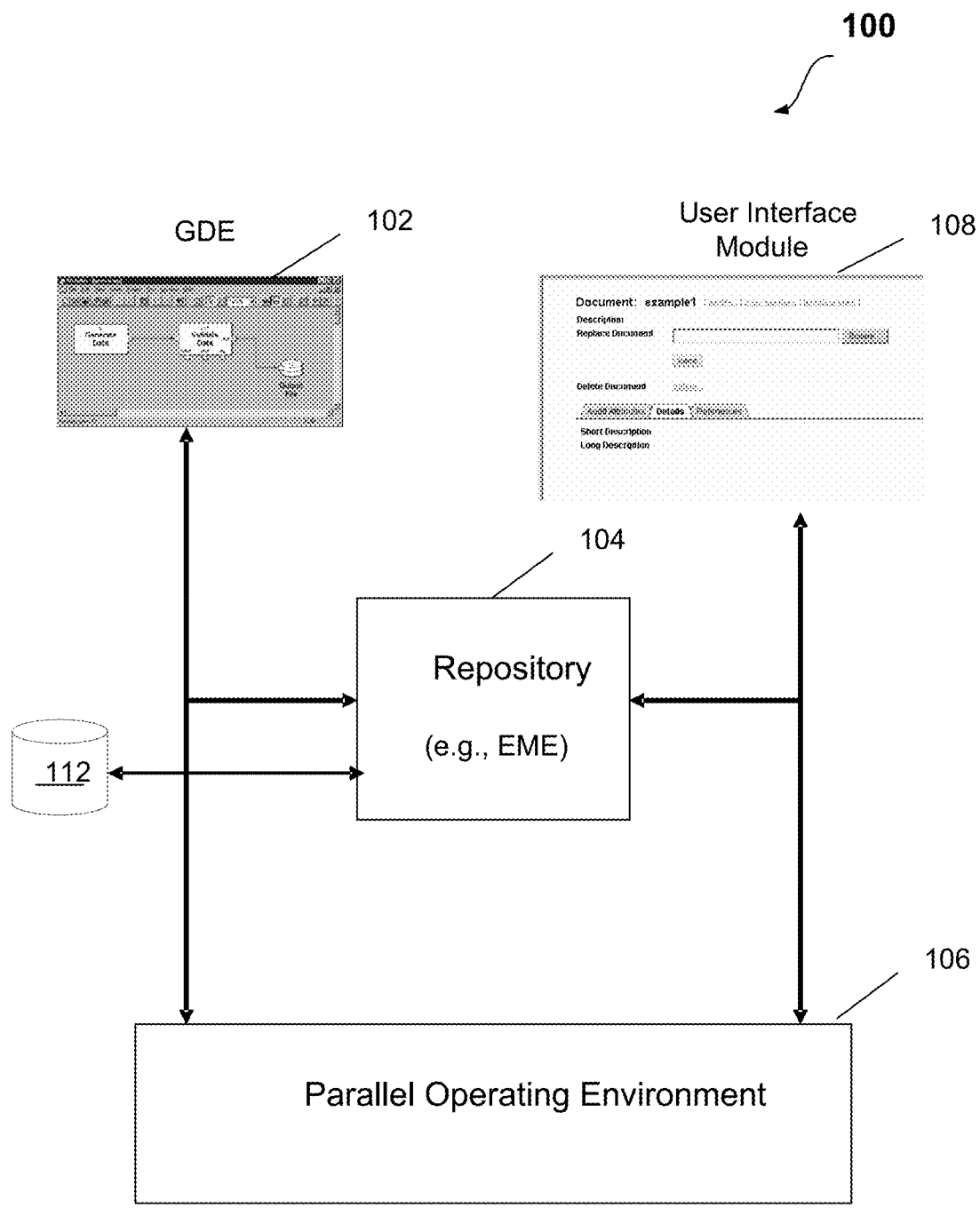
FIG. 1 is a block diagram of a system for executing graph-based computations.

FIG. 1 is a schematic block diagram showing the interrelationship of parts of a computing system 100 for developing, executing and managing graph-based computations. A graph-based computation is implemented using a "data flow graph" that is represented by a directed graph, with vertices in the graph representing components (e.g., data files, processes, etc.), and the directed links or "edges" in the graph representing flows of data between components. In some examples, a graphic development environment (GDE) 102 provides a user interface for specifying executable graphs and defining parameters for the graph components. The GDE 102 communicates with a repository 104 and a parallel operating environment 106. Also coupled to the repository 104 and the parallel operating environment 106 are a User Interface module 108 and an external data store 112.

The repository 104 preferably is a scalable object-oriented database system designed to support the development and execution of graph-based applications and the interchange of metadata between the graph-based applications and other systems (e.g., other operating systems). In this arrangement, the repository 104 is referred to as Enterprise Meta Environment (EME) and is capable of storing one or more types of metadata, including documentation, record formats (e.g., fields and data types of records in a table), transform functions, graphs, jobs, monitoring information, etc. In particular, the EME 104 may store metadata associated with graph-based computations. In this context, each computer program can be considered as being implemented using a computational graph, also called a dataflow graph, or simply a graph. A graph contains one or more components (or vertices) that may be in communication (e.g., by a flow or edge) to allow data flow. In some arrangements, the graphs can execute in the parallel processing environment 106.

Implemented as a datastore, the EME 104 can track changes in development of graphs, perform statistical and dependence analysis, manage metadata pertaining to the development of graphs, and provide other similar functionality. In general, the storage of graph related metadata allows for data impact analysis, thereby providing a user with a visual sense of how the data is changing in a graph, and the impacts those changes have upon one or more other graphs. Additionally, the EME 104 may permit multiple versions of a graph to be stored, e.g., to track code changes and adjustments during development. The EME 104 also stores data objects that represent actual data to be processed by the computing system 100 including data stored in the external data store 112.

The parallel operating environment 106 accepts a specification of a data flow graph generated in the GDE 102 and generates executable instructions (e.g., computer instructions) that correspond to the processing logic and resources defined by the graph. The parallel operating environment 106 then typically executes those instructions on a plurality of processors (which need not be homogeneous).

The User Interface module 108 provides a browser-based view of the contents of the EME 104. Using the User Interface module 108, a user may browse objects, generate new objects, alter existing objects, etc. For example, the User Interface module 108 may generate browser screens for a user to search for and view objects and information about objects stored in the EME 104.

Metadata stored in the EME 104 may include data objects for graph-based applications including graph components and other functional objects for building computation graphs. One or more types of metadata may also be stored in the EME 104, for example, "technical" metadata (e.g., application-related business rules, record formats, and execution statistics) and "enterprise" or "business" metadata (e.g., user-defined documentation of job functions, roles, and responsibilities) and other similar types may be stored.

The information stored in the EME 104 in the form of data objects enables various kinds of analysis regarding applications and the data processed by those applications. For example, a user can obtain answers to questions about data lineage such as where did a given value come from, how was the output value computed, and which applications produce and depend on the data. A developer can understand the consequences of proposed modifications (e.g., If this component changes, what else will be affected? If this source format changes, which applications will be affected?). A user or developer can also obtain answers to questions involving both technical metadata and business metadata, such as which user or developer groups are responsible for producing and using a particular set of data, or what is the latest update to a specific application.

The EME 104 may also be capable of tracking the status of stored data. For example, multiple versions of one or more data objects may be tracked and stored, thereby making it possible to examine the state of objects over a time period (e.g., over a week, month, or year), and to compare it with the current state of objects. For example, the EME 104 may collect job-tracking, or execution information which enables trend analysis (e.g., How fast is our data growing?) and capacity planning (e.g., How long did that application take to run? How much data did it process, and at what rate? What resources did the application consume? When will we need to add another server?).

A user can view (and optionally, edit) information contained in and associated with the stored data objects through the User Interface module 108. In one implementation, a user can define one or more "Views," which provide information in a browser page about a relevant subset of the data objects. A "View" is defined using a syntax for selecting one or more data objects based on relationships among those objects.

Figure 2:
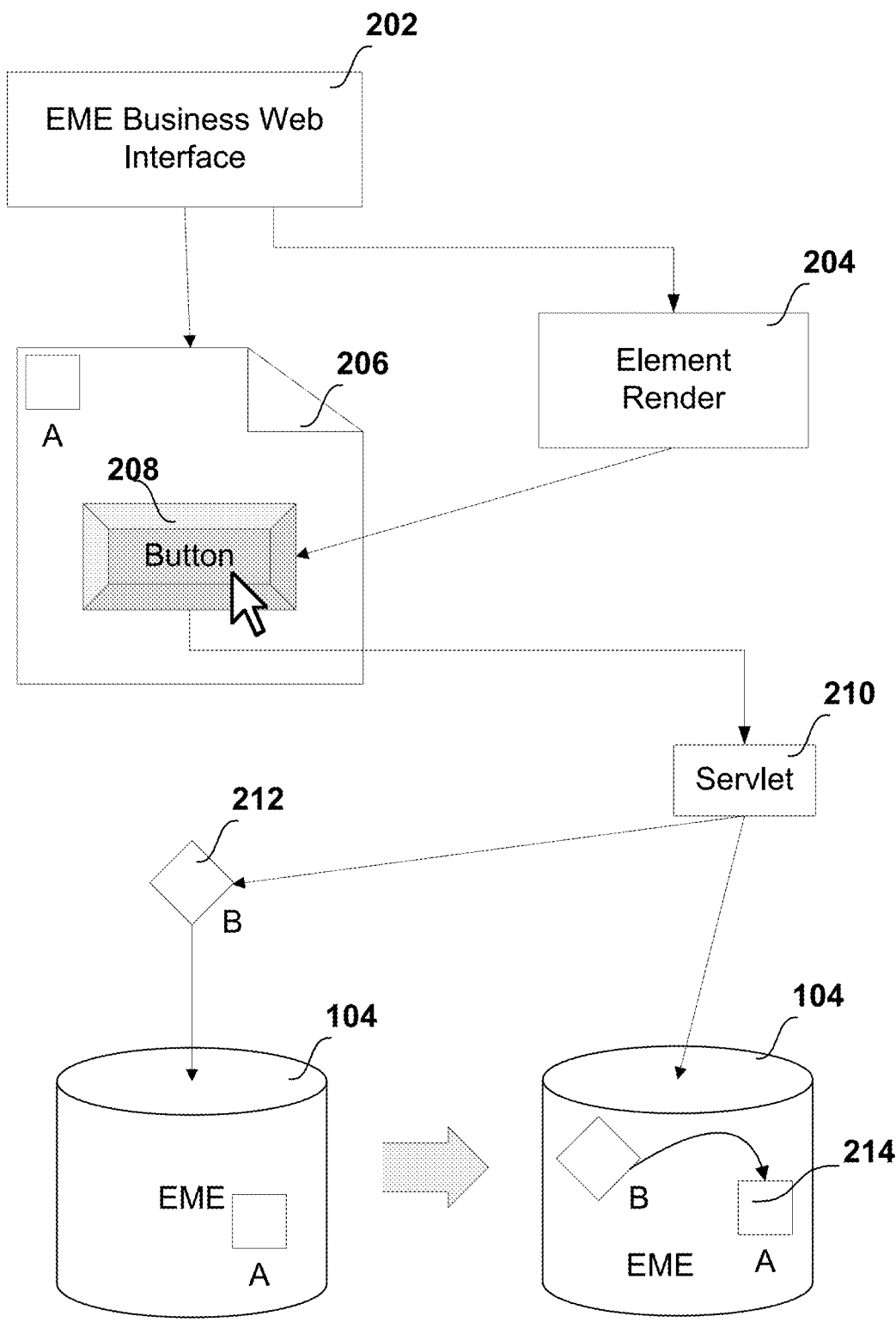
FIG. 2 illustrates computation graphs.
Figure 3:
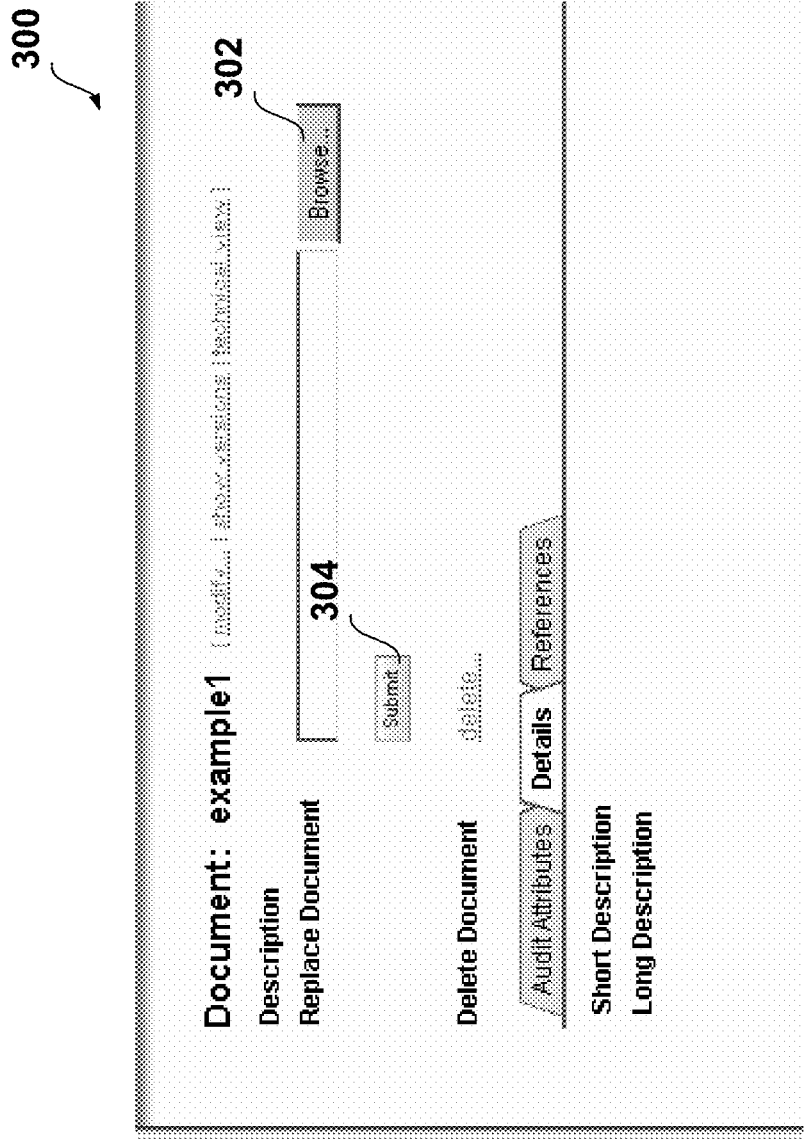
FIG. 3 is a screenshot.

As shown in FIG. 2, an EME browser interface 202 may be generated by the User interface module 108 in the EME 104. In order to display details about a specific object in the EME 104, the EME browser interface 202 may generate at least a portion of a browser page 206 (e.g., including a HyperText Markup Language (HTML) form) using information contained in the object (e.g., object A). For example, in the screenshot shown in FIG. 3, details about a Document object named "example 1" are displayed. Returning to FIG. 2, a call is made as part of this browser page 206 generation to an element renderer 204 that uses information from the object (e.g., object A) and returns a page or portions of a page to be rendered. The page may include various browser form elements, including display elements that display information associated with object A and include input elements for receiving user interaction. In this particular arrangement, a button 208 is provided as an element that is capable of receiving user interactions, however, other input elements may be used to receive any of a variety of user interactions. For example, menus (e.g., drop down menus), checkboxes and other similar types of elements may be utilized. In general, the element renderer 204 refers to reusable logic implemented by one or more software programs or routines that are usually defined for a particular activity that may be performed on any objects of a particular type. As such, the element renderer 204 may determine what actions are performed on an object, and subsequently determine which input element (e.g., button 208) should be rendered on the browser page 206 (displayed in the browser interface 202). The relationship between user actions and corresponding elements (e.g., buttons) is generally provided by the logic that is specified within the element renderer 204. If an element renderer has been configured to support multiple actions or different options, the user may pass parameters to the renderer when specifying its inclusion in the "View."

In one arrangement, an element renderer (referred to as "file_upload.py") can either add a new document to the EME 104 or replace an existing document. Referring to the screenshot shown in FIG. 3, elements to the right of the text "Replace Document" have been generated by the element renderer 204. However, which action to take may be specified when configuring the element renderer 204 as part of a "View." In one example, a function call element renderer (e.g., file_upload.py) may by default add a new document to the EME 104. The function call element renderer (e.g., file_upload.py, in which "action=replace") may also replace the current document. In another example, multiple parameters may be specified for such function calls (e.g., file_update.py, in which "action=add&rule_name=my_doc_oid"). To determine that particular elements are to be displayed (e.g., the button 208) by the element renderer, logic associated with the renderer may use provided parameters (and associated with part of a "View"). The element renderer 204 and its associated programs are also typically stored in the EME 104. Since the programs are not dedicated to a single object, such programs may apply to multiple objects presented in the EME 104.

In addition to the visible portions of an HTML form that are displayed in the browser (e.g., the file "browse" control button 302 and the "submit" button 304), hidden information within the HTML form may also be used during submission of a file (or another similar operation). In general, when the button 208 is pressed (via user interactions), regardless of scenario or associated functionality (e.g., the "submit" button 304 in FIG. 3), a script 210 is invoked. The script 210 may respond to various types of user requests (e.g., HTTP-specific services) and in turn provides server-side processing in the EME 104. Browser pages (e.g., browser page 206) for objects in the EME 104 may be drawn based on a particular object or set of objects. For example, browser pages that are displayed in response to a user selecting one or more objects stored in the EME 104 may be renderings of information or various characteristics associated with the selected objects. The scripts (e.g., script 210) may be capable of generating custom renderings of pages or elements of a page whose content and/or layout depend on the objects. In some arrangements, the element renderer 204 may render one or more elements of a browser page based on a particular object, and other portions of the browser page may include one or more renderings of elements based on a different object. Various types of input may be used by the script 210, for example, information associated with an object (e.g., object to A), user provided information (e.g., entered through the browser page 206) and other types of information. During execution, the script 210 may generate one or more other objects within the EME 104. For example, a second object B 212 may be produced within the EME 104, however, multiple objects may be produced. Along with producing one or more objects, the script 210 may also establish links (referred to as relations) between objects. For example, a link 214 may be established between the object B 212 and the object A. To establish such links, one or more techniques may be used, for example, commands may be called (e.g., using a command-line interface associated with EME 104). Along with being linked to the object (e.g., object A) associated with its production, the object B 212 can also be linked to other objects as determined by the script 210 associated with the rendered element or elements (e.g., button 304) for object A.

In this arrangement, EME 104 is an object oriented repository, and includes objects and associated relations. In some examples, a newly generated object may be linked to the object (or multiple objects) corresponding to the browser page being displayed. In other cases, linking to an object (e.g., an existing object) may be determined from information provided to the HTML form. In some examples, objects A and B may be linked in EME 104 (e.g., the link 214), and the link may be displayed as a link on the browser page 206 for navigation. Such techniques provide one or more advantages, for example, the knowledge of which objects to link in the EME 104 can be considered as being determined in an automated manner. Each object within the EME 104 may be stored in a "domain" which contains information about the relations that an object is associated with other objects in the EME 104. When generating one of the links (e.g., link 214) information may be added to the domain that indicates the domain to which the object is associated (e.g., points to). The script 210 may also update the target object's domain, e.g., to record an inverse relation (e.g., that another object points to it). Links such as link 214 could be shown for some or all of the documents that are stored in the EME 104 that relate to a particular object (e.g., object A or B). In some examples, the script 210 may check permissions associated with a user's input to determine whether generation of a new object is permitted, and if not the user can be notified.

In some arrangements, the user may also be directed to a new browser page or a refreshed version of the current page (e.g., page 206) to show the results of the action that has been performed (e.g., effects actions performed by the script 210). In some examples, multiple users may make modifications to the EME 104 approximately simultaneously, thereby causing the refresh to display the changes. In another example, due to the execution of the script 210, a new object (or multiple new objects) may be generated, some attributes may have been set (e.g., via direct user editing), and the new object (or objects) may have been linked to some existing objects. Based upon the refresh, a detailed view of the newly generated object may be displayed. This view may present to the user information that has been supplied by the user when editing the attributes. For example, the view of an object can take advantage of the links between objects to navigate to other objects in the EME 104 and gather additional information. Navigation may include performing a "walk" action from a starting object to another object linked to the starting object (e.g., either "upstream" or "downstream" based on a direction of the link). Multiple walk actions may be performed over successive links to navigate to one or more related objects. As a result of this walking, additional information can be presented to the user after a refresh.

The user may also be directed to a new browser page or refreshed version of the current page 206 to be prompted for additional information to be stored in the EME 104. For example, the user may be prompted to supply information associated with the newly generated object (e.g., object B) or a different object or objects related by navigating over relational links. An advantage of the automatic linking of the newly generated object is that the context of the object can help refine and enhance subsequent interaction with the user. For example, a user may provide input to generate a data object representing an employee on a browser page associated with one of multiple departments of an organization (e.g., based on a data object for the department). Upon refreshing the page, a menu (e.g., a dropdown menu) of choices can be provided for selecting a data object e.g., representing the supervisor of the added employee. If the script 210 automatically links the employee data object to the department data object, the list of choices in the menu can be limited to those existing employees whose data objects are linked to the department data object as members of that department.

The element renderer 204 may be implemented using, for example, a high level computer programming language, such as a python script or Korn shell scripts that are stored in the EME 104. The result of its execution is a fragment of the browser page 206 that is dependent on a View design and can be inserted into the rest of the content generated by the EME browser interface 202. The element renderer 204 may produce HTML for one element of the "View." In some examples, View elements are configured sequentially using a command-line interface (not shown). The browser page fragment returned by the element renderer 204 may appear to be as simple as a single button 208 in some cases, but in others the page portion may contain other form elements for data entry. The example illustrated in FIG. 3 has the file "browse" input element 302.

As mentioned above, when the user clicks to submit the file, the script 210 is typically invoked. The script 210 may be implemented as a python script or in another similar form. In some examples, the actions performed by the script 210 may be performed through the following steps. The script 210 may first generate a new object (e.g., object B 212) within the EME 104 datastore using the command line interface to the EME 104. Referring to the example illustrated in FIG. 3, associated with file uploading, the new object may be a file that the user has uploaded from their desktop computers. In other cases, the new object may initially be entirely empty, but generated as a placeholder to which other metadata or attributes can be attached. Next, the script 210 may link the new object to existing objects within the EME 104 (e.g., object A). Finally, the script 210 may direct the user to a new page or refresh the original page for the user. If the user is directed to a new page, that page is typically a web-based editor for the newly linked and generated object.

2 Examples

Example 1: User Feedback

In one implementation, a button (e.g., button 208) can be displayed on a browser page (e.g., the browser page 206) for any object in the EME 104. When a user clicks the button, a script (e.g., the script 210) may be configured to execute to generate a new note object. The script may also generate a link for the original object (e.g., object A) pointing to the new note object. The new note object that is generated is presumed to be about the original object. In some examples, the new note may not be stored as part of the original object. As such, to find and display this note at a later time, a link or relation between the original and new note objects may be generated. Thereby, browser pages or reports may be designed that display all of the notes relating to the object, or some larger collection of objects. For example, this implementation may be able to provide the feedback that users have entered on objects in a project. Further, a user may be redirected to an editor to enter the text content for the new note object.

Example 2: File Upload

In this example, the element render 204 is used to display a form containing a file browse control (e.g., a user selectable file on a computer system for upload to a server) and a button (e.g., the button 208) on a browser page for an EME object. In some examples, the element renderer 204 generates a browser page element that is associated with a unique identifier, and allows multiple file upload forms to be displayed on the same browser page. After the user browses to select a file (e.g., an Excel spreadsheet) relating to an object that is part of a project residing in the EME 104 (and clicks the button), the script 210 is called to load the file into the EME 104 as a new document object. Operations associated with the script 210 may generate a link from the object corresponding to the original browser page to the new document object. Subsequently, the user may be redirected to a browser page for the original object that shows a list of documents to which the object is linked for navigation and reporting purposes.

Example 3: Horizontal Versioning of Rulesets in a Business Rule Environment (BRE)

Figure 4A:
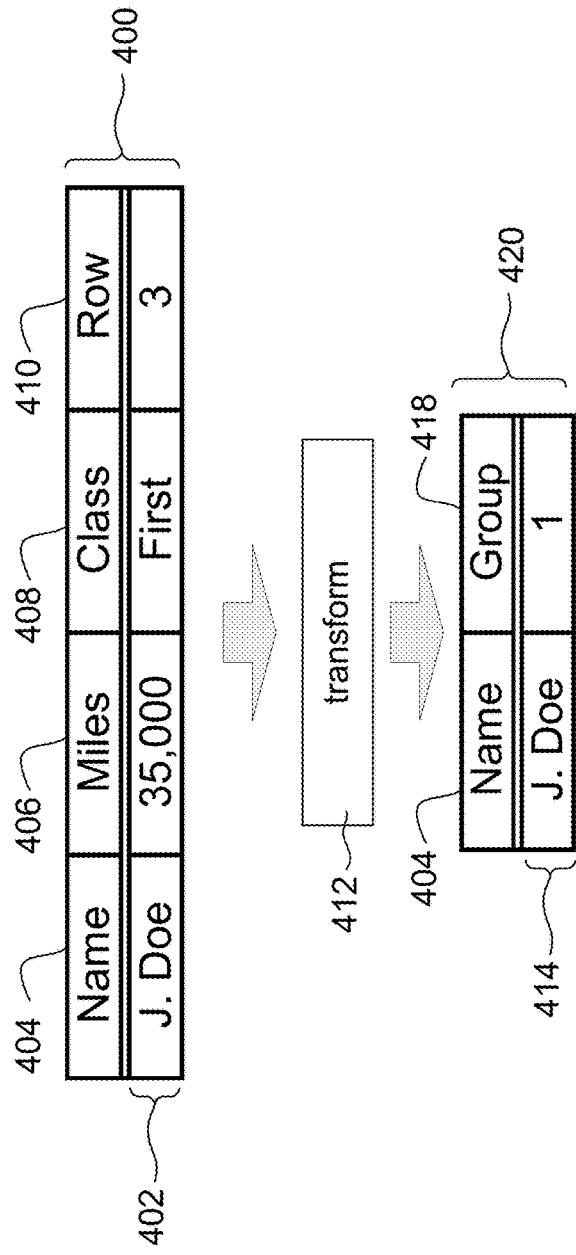
FIG. 4A illustrates transforming input data into output data in a graph-based computation environment.

In one implementation, business rules (e.g., in the form of a subset of metadata) may be stored in the EME 104. Various types and aspects of business rules may be implemented, for example, the rules described in U.S. application Ser. No. 11/733,434, entitled "Editing and Compiling Business Rules" and filed on Apr. 10, 2007, which is incorporated herein by reference in its entirety. Each business rule can be stored in a separate EME object. A business rule can be expressed as a set of criteria for converting data from one format to another, making determinations about data, or generating new data based on a set of input data. For example, in FIG. 4A, a record 402 in a flight reservation system includes values for fields that indicate the name 404 of a passenger, how many miles 406 the passenger has flown this year, the class 408 of the passenger's ticket, and the row 410 in which the passenger is seated. A business rule may indicate that such a passenger should be assigned to a particular boarding group (e.g., boarding group 1). While a business rule may be generally understandable to a user, e.g., "first class passengers are in group 1," such information may need to be translated into one or more other forms to be recognized and processed by a computing device (e.g., a computer system).

In one particular arrangement, to implement business rules in a graph-based computation environment, a transform 412 may be generated that receives input records, such as record 402, from one or more data sources (e.g., input dataset 400). The transform may insert this information into an output record, e.g., a record 414, which indicates the passenger's name 404 and which group the passenger has been assigned (e.g., a group 418). The record 414 may be correspondingly inserted into an output dataset 420. In this example, the datasets (e.g., dataset 420) are illustrated showing an exemplary record, but in general the datasets may include any number and types of records. In some arrangements, input and output datasets may also be referred to as data streams, for example, as the data (from the datasets) may flow into or out of a graph.

Figure 4B:
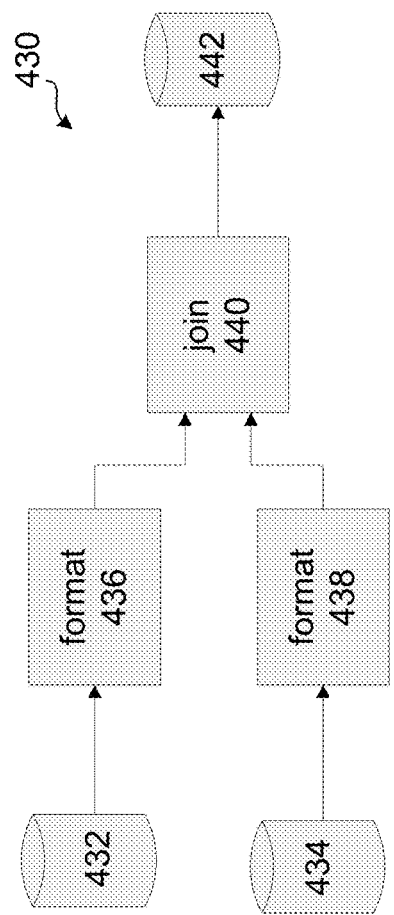
FIG. 4B illustrates and example of a graph-based computation.

The transforms may be incorporated into graph-based computations having data processing components and that may be connected by linking elements representing data flows. For example, a computation graph 430 illustrated in FIG. 4B includes two data sets 432, 434 (for example, frequent flier data and flight reservation data) that provide input for one or more computations. Format components 436, 438 format the input data, for example, using similar or different types of adjustments to produce commonly formatted data sets that be combined (e.g., by a join component 440) to produce an output data set 442 (that may be used with additional processing operations). A transform may itself be a graph-based computation, such as that in the graph 430, or may be implemented within a component of a graph, such as the individual components 436, 438, and 440 of which the graph 430 is composed.

In some arrangements, one or more techniques may be used to simplify generation of transforms (e.g., for non-technical users). For example, a tool may be provided for users to input a set of business rules (referred to as a ruleset) in a familiar format that provides a computer system with the one or more transforms to be executed. For example, a ruleset may be considered a set of rules that produce a single transform. A rule may be composed of one or more rule cases that compute different values for the rule's output depending on the input. A rule may also include multiple rules, which may produce values for additional or alternative outputs. A rule set may also contain other rulesets, which may be referred to as "included" rulesets.

For a project in the EME 104, a browser page may list some or all of the rulesets contained in the project. The browser page in this case may display details that are related to a particular object, e.g., a particular project. Projects in EME 104 usually contain various kinds of technical metadata. In this example, the browser page may list all the rulesets that are contained in the project. For each ruleset in the list, a number of buttons or other types of elements may be displayed, for example, through use of the same element renderer 204.

Referring to FIG. 5, a series of row are included in an exemplary list, and each row in the list includes four buttons (e.g., buttons 502, 504, 506 and 508). Each of the displayed buttons are provided by calling an element renderer (e.g., the element renderer 204) with different options. More specifically, buttons 502, 504, 506, 508 respectively represent different actions that can be performed based upon the ruleset: "Promote Ruleset", "Demote Ruleset", "New Minor Version", and "New Major Version". Promoting a ruleset broadly may be associated with transitioning a particular ruleset from a development phase to a testing phase, and finally to a production phase (e.g., where the ruleset may be executed by a user for data processing). These four actions may be used to promote or demote the rule during the development lifecycle and to possibly generate different versions of the rule (e.g., a new major version, a minor version, etc.). Such a capability allows for previous versions of a ruleset (which may be relatively old) to be accessed (and used) while allowing the ruleset evolve over a period of time. For example, rather than changing an existing rule or ruleset, a new copy of the rule or ruleset may be generated, adjusted and assigned a new version number.

In some arrangements, an element renderer (e.g., element renderer 204) may be configured to determine whether a particular button should be displayed based upon one or more permissions associated with a ruleset. For example, a permission may be associated with modifying the ruleset and its current development lifecycle. Referring to the development lifecycles as an example, different phases in that lifecycle may be development ("Dev"), testing ("Test") and production ("Prod"). So the logic of the element renderer (e.g., element renderer 204) may sequentially step through these three phases (in that particular order). Once the "Prod" phase is reached, the ruleset may not be further promoted. Similarly, in the "Dev" phase the user may not further demote the rule. The element renderer 204 may also pre-calculate confirmation text that can be displayed if the user clicks the button. That is, when the user clicks on one of the buttons, a popup graphic that includes text may be displayed and confirm the action. For example, clicking on the button 502 in the first row may popup a dialog box with text indicative of "Are you sure that you want to Promote Ruleset-1-Dev to Test?" By providing such a display, the user may confirm the action so the probability of accidental changes (from accidental clicks) is reduced.

In addition, when a user clicks one of the buttons, the script 210 is called and makes a copy of the corresponding ruleset. Already populated with content, the ruleset is copied and can be used as a starting point for subsequent changes. Alternatively, the copy may serve as a backup, such that changes may be made to the original. The name for the new copy of the ruleset may be determined based on the original name of the rule and the action. Different names may also be used so that the user can distinguish them later. For example, if the rule name originally ends in "Dev" and it is being promoted, the new rule name might end in "Test". As mentioned, different activities are being performed on the rule at different stages. When in the "Dev" stage, it can be considered as being modified by a developer. When in the "Test" stage, the rule or ruleset is generally being checked for appropriate behavior and is typically remains unchanged. In the "Prod" stage, the ruleset is being used, for example, for its intended purpose and typically is not changed. Different stages and versions may be necessary because as soon as a ruleset is promoted from "Dev" to "Test", a developer may start making new changes. Based on the new name, the script 210 may need to update some information that is stored within the ruleset. In some examples, rulesets contain information about the name of the code file (e.g., the transform 412 for a graph in FIG. 4). In some examples, this code file is named after the ruleset. As such, if a ruleset is generated with a new name, the name for the file generated is also updated. Subsequently, the user may be redirected to the list of rulesets in the project which has been updated to contain the new rule (and be allowed to view the result of the performed action). For example, if any of these actions are performed on a ruleset, the user is taken to a browser page for the new or modified rule.

Example 4: A Wizard for Object Creation

Figure 6:
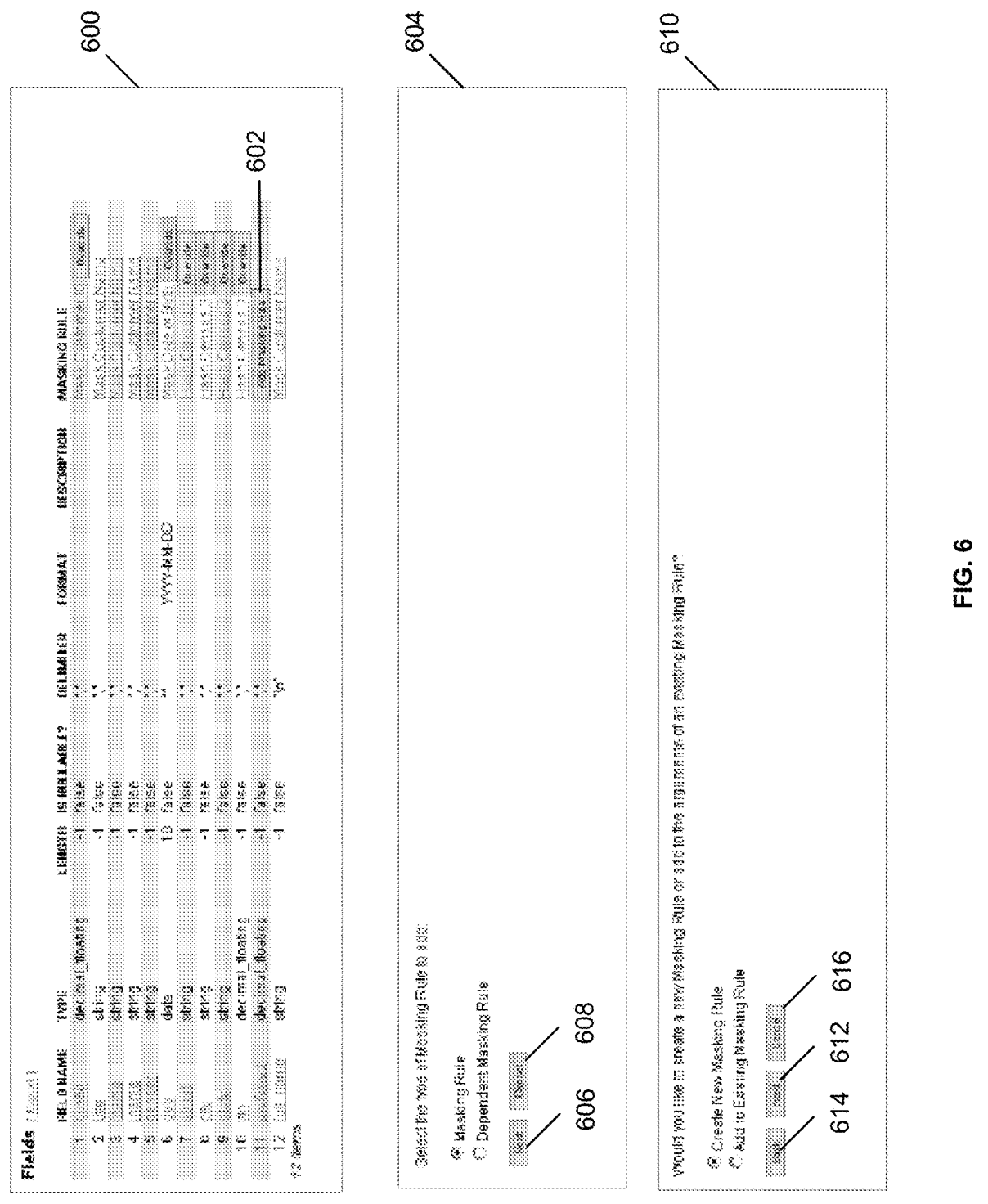

Referring to FIG. 6, additional operations may be implemented for producing one or more objects, for example, based upon user interaction. In one arrangement, information may be gathered from a user, over a series of steps, for producing one or more objects. For example, user interaction (e.g., a user clicking on a graphical representation of a button) may initiate the execution of a wizard (e.g., series of dialogs) or another type of UI screen sequence that guide a user through a series of steps. While stepping through the sequence, information is collected e.g., from the user that is used for producing one or more objects. The collected information may also be used for other operations, for example, the collected information may represent properties associated with one or more objects and may be used for modifying the object or objects.

As shown in the figure, a portion of a screen 600, for illustrative purposes, includes fields (e.g., columns) in a dataset (e.g., a table). In this example, a data masking rule (e.g., obfuscation, de-identification, etc.) is defined and may operate upon data associated with the fields. To initiate the process, a graphical representation of a button 602 (labeled "Add Masking Rule") is selected by a user (through interactions with a pointing device such as a mouse). Upon being selected, a wizard is executed that includes a series of screens. For example, a portion of a first wizard screen 604 may be presented first for collecting user provided information. In this particular example, the wizard screen 604 presents two radio buttons and prompts the user to select the type of masking rule to be produced. Once the selection is made, the user may select a button 606 (labeled "Next") to transition to the next wizard screen. To terminate the wizard, another button 608 (labeled "Cancel") may be selected by the user. Next, in this scenario, another wizard screen is presented (as provided by a portion of a screen 610). For this particular screen 610, two radio buttons are presented for the user for selecting whether to create a new rule or to add to an existing rule. Based upon the selections provided by the user, the wizard may determine which particular path (e.g., series of screens) is followed. As such, the wizard may include multiple branched paths (e.g., tree structures) for various user directed scenarios. Similar to the screen 604, the user may select to proceed forward with the wizard by selecting a button 612 (labeled "Next"), move back one screen by selecting a button 614 (labeled "Back") or halt the wizard by selecting a button 616 (labeled "Cancel"). Upon making the selection, the wizard executes appropriate actions.

Figure 7:
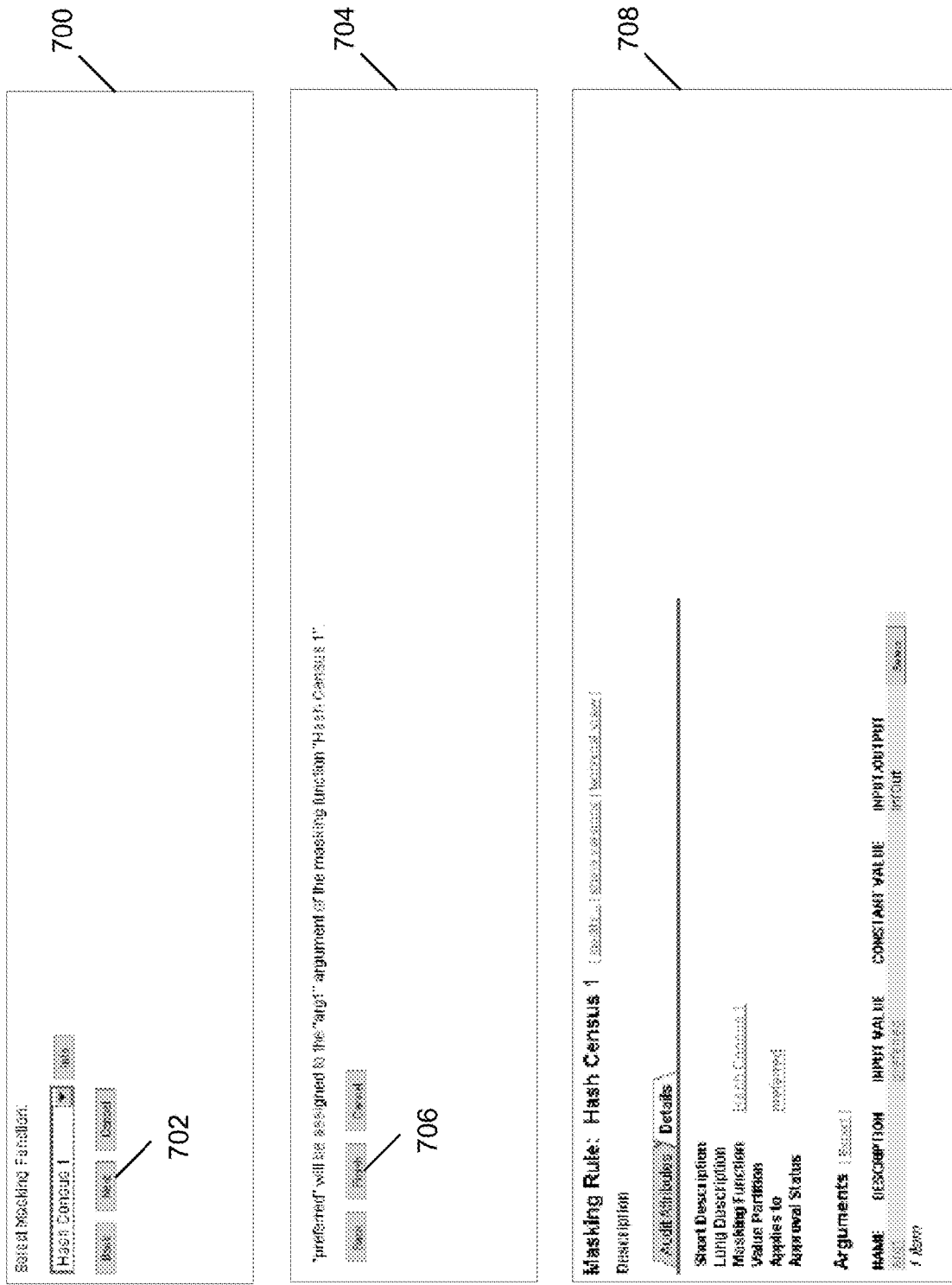

Referring to FIG. 7, another portion of a screen 700, which is provided by the wizard, prompts the user to select from a list of objects to define the masking rule. For the selection, in this example, a list of functions is provided in a menu (e.g., a drop down menu). Each of the selected functions may be associated with one or more objects that may be stored (e.g., in the repository 104). In this example, one or more masking functions (e.g., Hash Census 1) are associated with the stored objects. Along with using the menu for mask selection, the user can use buttons (similar to the buttons 612, 614 and 616) to control the direction traveled through the wizard. In this example, a button 702 (labeled "Next") is selected to move forward to a screen 704 that provides a summary of the user selections. For this example, the field named "preferred" (as illustrated in screen 600) is associated the function "Hash Census 1". Upon reviewing this information and selecting a button 706 (labeled "Finish"), a new object (or multiple objects) is produced and one or more graphical representations may be produced, e.g., to navigate to the object (or objects). For example, briefly returning to the screen 600 of FIG. 6, a link to the newly produced object may replace the graphical button 602 and upon being selected, the link may direct the user to the new object. In one arrangement, a screen 708 may be presented to the user to view information and parameters associated with the produced object. While this wizard example demonstrated the production of an object (or multiple objects), other operations may be provided by similar wizards. For example, object adjustments (e.g., function assignments, etc.), object deletions and other similar operations may be executed.

Example 5: Edit Renderer

Figure 8:
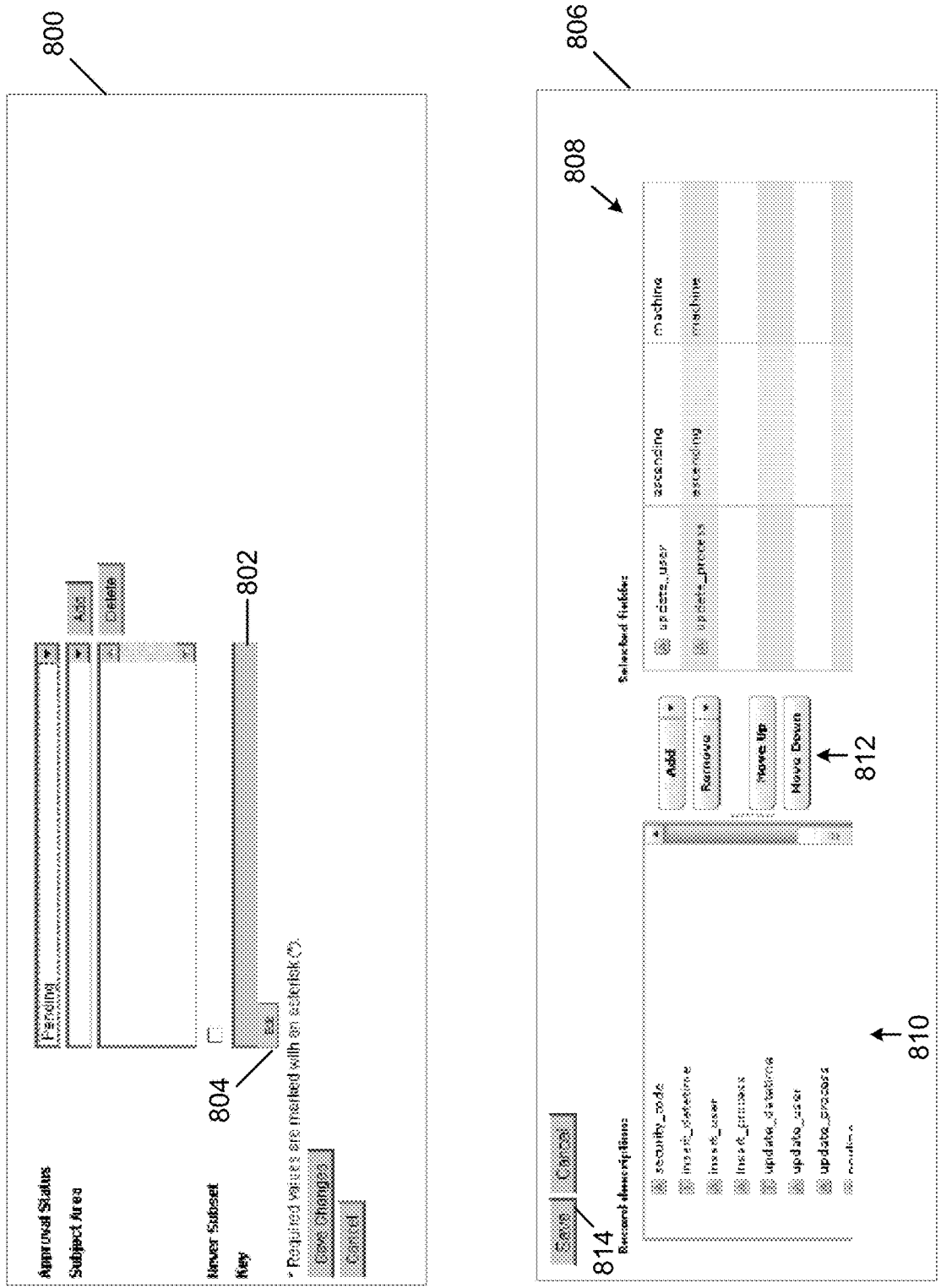
FIGS. 8 and 9 illustrate a series of screens associated an object editor.

Referring to FIG. 8, upon one or more objects being created, other operations such as operations associated with exchanging data may be executed. In one arrangement, the functionality of an element rendered may be expanded to include editing capabilities. For example, a script, program or other type of instruction collection may be executed to produce an object that may be associated with another program (e.g., a dedicated editor). Introducing an editor that is associated with an object allows editing capabilities to be expanded (e.g., editing metadata with constraints, launching external edit controls, etc.). Along with enhancing editing capabilities, the editor associated with the object may increase editing flexibility.

As illustrated in the figure, a screen 800 includes a portion of an edit screen. A field 802 included in the screen (labeled "Key") has a control that is an edit renderer. In this example, a value (e.g., a numerical value, text, function, etc.) can not be directly entered or edited. Rather, a graphical button 804 may be selected by a user to launch an editor that is associated with the object of the Key field. In this arrangement, a screen 806 presents an exemplary editor 808 that is associated with the Key field and allows user selected information to be associated with the field. In this particular arrangement, the editor 808 is implemented with a software development product, which produces rich internet applications (e.g., user interfaces) for multiple platforms, such as Flex (from Adobe Systems of San Jose, Calif.). In this particular example, the editor 808 provides the user with a set of selectable records 810 and selection tools 812 for identifying data for the Key field 802. Once selected, a graphical button 814 may be selected to return (and provide the selected data) to the previous screen 800.

Figure 9:
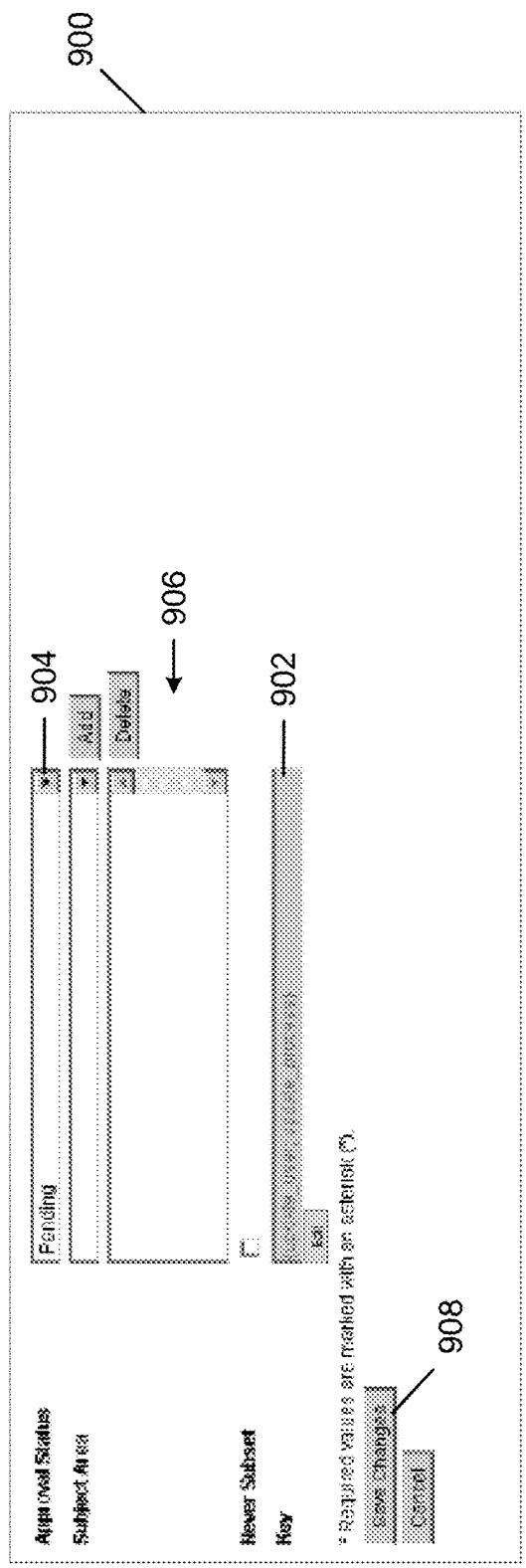

Referring to FIG. 9, a screen 900 represents an updated version of the screen 800 with the Key field populated with the information from the editor 808 (shown in screen 806). In particular, an updated Key field 902 includes the two selected fields from the editor 808. As such, two sets of data are associated with screen 900, however, in some example additional sets of data may be present. One of the data sets may be provided from objects associated with the screen 900, for example, data selected with a pull down menu 904 and entered into a dialog 906 rendered in the screen 900. The second set of data is provided by the editor 808 included in the screen 806 (and associated with the Key field 802). This data may be passed, for example, to another screen by using one or more techniques. For example, the data sets may be placed into a similar form. In one arrangement, the data may be bundled together in a predetermined form or format to be submitted in a query string (e.g., a HTTP query string). For example, the user may select a graphical button 908 (labeled "Save Changes") that initiates the bundling of the data into a query string. Upon being bundled into the query string, the string may be provided to one or more screens, objects, or other locations for additional processing and presentation. Various types of editors may also be implemented, for example, editors associated with time and date, graphical editors (e.g., for viewing various aspects of three dimensional objects) and other types of editors may be used.

3 Implementation Approaches

Figure 10:
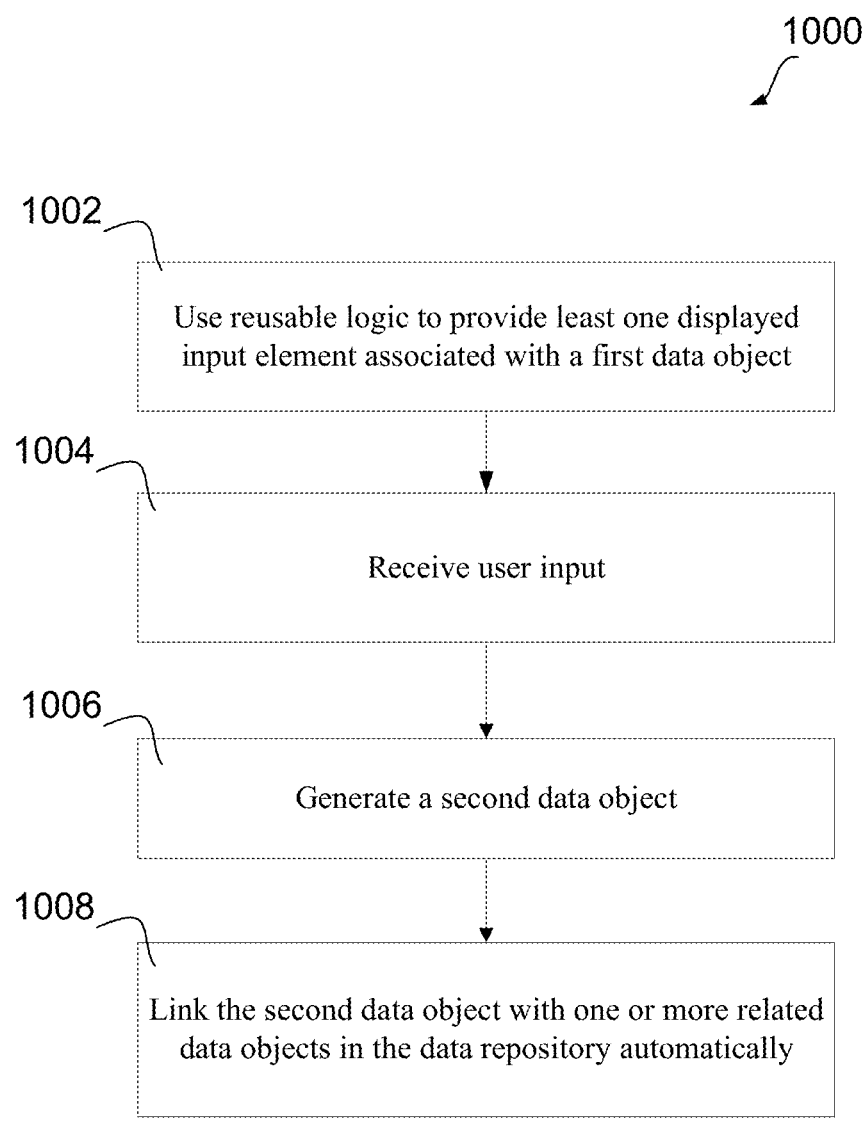
FIG. 10 is a flowchart of example operations of generating, displaying and linking data objects stored in a data repository.

Referring to FIG. 10, a flowchart 1000 represents some operations implemented by an element renderer (e.g., element renderer 204) and a script (e.g., the script 210) for managing data objects stored in a data repository (i.e., the EME 104) and displaying elements associated with data objects on a graphical user interface (i.e., the user interface module 108).

As mentioned, richly interconnected metadata objects in the EME 104 may be referenced by relational links. In addition to enforcing and maintaining the logic relationships among multiple data objects, the EME 104 also uses a web-browser-based graphical user interface (e.g., interface 202) to display details of a specific data object. In particular, the information within an object is automatically used to generate 1002 a form (e.g., a web form) that may invoke corresponding operations on one or more data objects. This is typically implemented by the element renderer, which is applicable to almost all data objects that reside in EME 104. Upon receiving 604 user input represented by various user interface interactions regarding the data object, the script 210 may translate user input data in the web form to generate 1006 a new data object within the data repository. Rather than merely copying the input data or representing a temporary variable obtain during intermediate computation, this new data object includes contents that may persist in the EME 104. Subsequently, linking 1008 the new data object with one or more related data objects in the EME 104 may be automatically implemented based on the location where the user operation is invoked. As a result of above mentioned objects generation and linking, the browser interface 202 manages contents for display on the graphical user interface and enables the user to see changes in the EME 104 through the interface.

The object generating and linking approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the description, which is defined by the scope of the appended claims. Other embodiments are within the scope of the following claims.

What is claimed is:

1. A method for managing one or more data objects stored in a data repository and causing display of one or more elements associated with one or more data objects on a graphical user interface, the method including:
receiving a rule specification that specifies one or more rules, each rule including a set of rule cases that compute values for the rule's output depending on the rule's input, each rule case including one or more input relationships in which a rule case is triggered by a given input record if one or more data values of the given input record meet the one or more input relationships;
causing display of a first data object representing at least one of the one or more rules;
associating the at least one of the one or more rules with a first stage of a plurality of stages;
causing display of one or more input elements based on permitted transitions associated with the at least one of the one or more rules and the first stage, each input element representing a permitted transition of the at least one of the one or more rules from the first stage to a different stage among the plurality of stages;

in response to user input selecting one of the one or more displayed input elements, associating the at least one of the one or more rules with a second stage of the plurality of stages, in which the selected displayed input element represents the transition from the first stage to the second stage;

associating an application program with the at least one of the one or more rules; and executing the application program to process the input records and produce the outputs according to the at least one of the one or more rules;

wherein data for the graphical user interface configures the graphical user interface to display the one or more input elements, receive the user input, associate the application program with the at least one of the one or more rules, and execute the application program.

2. The method of claim 1, wherein causing display of the first data object representing at least one of the one or more rules includes displaying the first data object representing at least one of the one or more rules; and wherein causing display of one or more input elements includes displaying one or more input elements.

3. The method of claim 1, in which the plurality of stages includes a plurality of development stages of a development lifecycle.

4. The method of claim 1, in which the plurality of development stages includes at least one of a develop stage or a test stage.

5. The method of claim 1, in which receiving a rule specification includes receiving a spreadsheet having a plurality of rows that correspond to the rule cases.

6. The method of claim 5 in which the spreadsheet includes trigger columns that correspond to data values, and the rule cases include sets of triggering criteria that relate to the data values.

7. The method of claim 6 in which each rule case is configured such that the rule case applies to a given record if one or more data values of that record, for each trigger column in which the rule case has a criterion or criteria, meets the triggering criterion or criteria.

8. The method of claim 7 in which the spreadsheet includes one or more output columns, each output column corresponds to a potential output variable, and a value of the output variable is determined by a cell in the output column, in which the cell is at the row corresponding to the rule case that applies to the given record.

9. The method of claim 8 in which the cell includes at least one of an output value that is assigned to the output variable or an expression that is evaluated to generate the output value.

10. The method of claim 1, in which a rule includes a set of criteria for performing at least one of converting data from one format to another, making determinations about data, or generating new data based on a set of input data.

11. The method of claim 1, in which the rule specification includes a rule specification table having a plurality of rows, each row defining a rule case and specifying a relationship for each of a set of one or more potential inputs.

12. The method of claim 11 in which at least one of the relationships includes one or more of having a value equal to a threshold, having a value above a threshold, having a value below a threshold, having a value belonging to a set of values, having a value matching a pattern, having a relationship to a value of another input, having a relationship to a value of an output of another rule specification, or having a relationship to a value in a memory.

13. The method of claim 12 in which at least one of the rows also specifies an output including one or more of a combination of values of the inputs, a pre-determined value, or a value computed from one or more of the values of the inputs.

14. The method of claim 1, including converting a rule in the rule specification to one or more logical expressions, compiling the one or more logical expressions into computer-executable code, and incorporating the computer-executable code into the application program.

15. The method of claim 1, including converting the plurality of rule cases to a transform, and associating the transform with a component in a graph-based computation having data processing components connected by linking elements representing data flows.

16. The method of claim 1, in which the permissible transitions include at least one of (i) a rule in an earlier stage in a development lifecycle, relative to one or more other stages in the development lifecycle, can be promoted to a later stage but cannot be further demoted, (ii) the rule that is in neither the earlier stage nor the last stage in the development lifecycle can be promoted to a later stage or demoted to the earlier stage in the development lifecycle, or (iii) the rule in a last stage in the development lifecycle can be demoted to the earlier stage but cannot be further promoted.

17. The method of claim 16 in which causing display of the one or more input elements includes at least one of (i) when a rule is in the earliest stage of the development lifecycle, a first input element for promoting the rule is caused to be shown and no input element for demoting the rule is caused to be shown in the user interface, (ii) when the rule is in neither the earliest nor the last development stage, the first input element for promoting the rule and a second input element for demoting the rule are caused to be shown in the user interface, or (iii) when the rule is in the last development stage, the second input element for demoting the rule is shown and no input element for promoting the rule is caused to be shown in the user interface.

18. The method of claim 1, including storing a copy of a rule and automatically naming the copy of the rule based on an updated stage associated with the rule.

19. A method for managing one or more data objects stored in a data repository and causing display of one or more elements associated with one or more data objects on a graphical user interface, the method including:

receiving a rule specification that specifies one or more rules, each rule including a set of rule cases that compute values for the rule's output depending on the rule's input, each rule case including one or more input relationships in which a rule case is triggered by a given input record if one or more data values of the given input record meet the one or more input relationships;

causing display of a data object representing a first version of the one or more rules;

associating the first version of the one or more rules with a first stage of a plurality of stages;

causing display of a first set of one or more input elements representing one or more transitions of the first version of the one or more rules from a current stage to another stage among the plurality of stages;

in response to user input selecting one of the first set of one or more displayed input elements, associating the first version of the one or more rules with a second stage of the plurality of stages;

generating a second version of the one or more rules;

causing display of a second set of one or more input elements representing one or more transitions of the second version of the one or more rules from a current stage to another stage among the plurality of stages;

in response to user input selecting one of the second set of one or more displayed input elements, associating the second version of the one or more rules with a third stage of the plurality of stages, in which the third stage is different from the second stage;

enabling access to the first version of the one or more rules in the second stage;

associating an application program with the first version of the one or more rules in the second stage;

executing the application program to process one or more input records and to produce one or more first outputs according to one or more rules of the first version of the one or more rules in the second stage;

enabling access to the second version of the one or more rules in the third stage;

associating the application program with the second version of the one or more rules in the third stage; and executing the application program to process the one or more input records and to produce one or more second outputs according to one or more rules of the second version of the one or more rules in the third stage;

wherein data for the graphical user interface configures the graphical user interface for the displaying of the input elements, the receiving of the user inputs, the associating of the application program with the one or more rules, and the executing of the application program.

20. The method of claim 19 in which the first set of one or more input elements is the same as the second set of one or more input elements.

21. The method of claim 19 in which the first set of one or more input elements is different from the second set of one or more input elements.

22. The method of claim 19, including causing display of a third set of one or more input elements representing one or more new versions of the one or more rules, and in response to user input selecting one of the third set of one or more input elements, generating the second version of the one or more rules.

23. The method of claim 22, in which causing display of the third set of one or more input elements includes causing display of a first input element representing a new minor version of the one or more rules, and causing display of a second input element representing a new major version of the one or more rules, and the method further includes:

in response to user input selecting the first input element, generating a new minor version of the one or more rules, and in response to user input selecting the second input element, generating a new major version of the one or more rules.

24. The method of claim 19, wherein causing display of the data object representing the first version of the one or more rules includes displaying the data object representing the first version of the one or more rules;

wherein causing display of the first set of one or more input elements includes displaying the first set of one or more input elements; and wherein causing display of the second set of one or more input elements includes displaying the second set of one or more input elements.

25. One or more non-transitory machine readable media for managing one or more data objects stored in a data repository and causing display of one or more elements associated with one or more data objects on a graphical user interface, the one or more non-transitory machine readable media storing one or more instructions that are executable by one or more processors to perform operations including:

receiving a rule specification that specifies one or more rules, each rule including a set of rule cases that compute values for the rule's output depending on the rule's input, each rule case including one or more input relationships in which a rule case is triggered by a given input record if one or more data values of the given input record meet the one or more input relationships;

causing display of a first data object representing at least one of the one or more rules;

associating the at least one of the one or more rules with a first stage of a plurality of stages;

causing display of one or more input elements based on permitted transitions associated with the at least one of the one or more rules and the first stage, each input element representing a permitted transition of the at least one of the one or more rules from the first stage to a different stage among the plurality of stages;

in response to user input selecting one of the one or more displayed input elements, associating the at least one of the one or more rules with a second stage of the plurality of stages, in which the selected displayed input element represents the transition from the first stage to the second stage;

associating an application program with the at least one of the one or more rules; and executing the application program to process the input records and produce the outputs according to the at least one of the one or more rules;

wherein data for the graphical user interface configures the graphical user interface to display the one or more input elements, receive the user input, associate the application program with the at least one of the one or more rules, and execute the application program.

26. The one or more non-transitory machine readable media of claim 25, wherein causing display of the first data object representing at least one of the one or more rules includes displaying the first data object representing at least one of the one or more rules; and wherein causing display of one or more input elements includes displaying one or more input elements.

27. The one or more non-transitory machine readable media of claim 25, in which the plurality of stages includes a plurality of development stages of a development lifecycle.

28. The one or more non-transitory machine readable media of claim 25, in which the plurality of development stages includes at least one of a develop stage or a test stage.

29. The one or more non-transitory machine readable media of claim 25, in which receiving a rule specification includes receiving a spreadsheet having a plurality of rows that correspond to the rule cases.

30. The one or more non-transitory machine readable media of claim 29, in which the spreadsheet includes trigger columns that correspond to data values, and the rule cases include sets of triggering criteria that relate to the data values.

31. The one or more non-transitory machine readable media of claim 30, in which each rule case is configured such that the rule case applies to a given record if one or more data values of that record, for each trigger column in which the rule case has a criterion or criteria, meets the triggering criterion or criteria.

32. The one or more non-transitory machine readable media of claim 31, in which the spreadsheet includes one or more output columns, each output column corresponds to a potential output variable, and a value of the output variable is determined by a cell in the output column, in which the cell is at the row corresponding to the rule case that applies to the given record.

33. The one or more non-transitory machine readable media of claim 32, in which the cell includes at least one of an output value that is assigned to the output variable or an expression that is evaluated to generate the output value.

34. The one or more non-transitory machine readable media of claim 25, in which a rule includes a set of criteria for performing at least one of converting data from one format to another, making determinations about data, or generating new data based on a set of input data.

35. The one or more non-transitory machine readable media of claim 25, in which the rule specification includes a rule specification table having a plurality of rows, each row defining a rule case and specifying a relationship for each of a set of one or more potential inputs.

36. The one or more non-transitory machine readable media of claim 35, in which at least one of the relationships includes one or more of having a value equal to a threshold, having a value above a threshold, having a value below a threshold, having a value belonging to a set of values, having a value matching a pattern, having a relationship to a value of another input, having a relationship to a value of an output of another rule specification, or having a relationship to a value in a memory.

37. The one or more non-transitory machine readable media of claim 36, in which at least one of the rows also specifies an output including one or more of a combination of values of the inputs, a pre-determined value, or a value computed from one or more of the values of the inputs.

38. The one or more non-transitory machine readable media of claim 25, including converting a rule in the rule specification to one or more logical expressions, compiling the one or more logical expressions into computer-executable code, and incorporating the computer- executable code into the application program.

39. The one or more non-transitory machine readable media of claim 25, including converting the plurality of rule cases to a transform, and associating the transform with a component in a graph-based computation having data processing components connected by linking elements representing data flows.

40. The one or more non-transitory machine readable media of claim 25, in which the permissible transitions include at least one of (i) a rule in an earlier stage in a development lifecycle, relative to one or more other stages in the development lifecycle, can be promoted to a later stage but cannot be further demoted, (ii) the rule that is in neither the earlier stage nor the last stage in the development lifecycle can be promoted to a later stage or demoted to the earlier stage in the development lifecycle, or (iii) the rule in a last stage in the development lifecycle can be demoted to the earlier stage but cannot be further promoted.

41. The one or more non-transitory machine readable media of claim 40, in which causing display of the one or more input elements includes at least one of (i) when a rule is in the earliest stage of the development lifecycle, a first input element for promoting the rule is caused to be shown and no input element for demoting the rule is caused to be shown in the user interface, (ii) when the rule is in neither the earliest nor the last development stage, the first input element for promoting the rule and a second input element for demoting the rule are caused to be shown in the user interface, or (iii) when the rule is in the last development stage, the second input element for demoting the rule is shown and no input element for promoting the rule is caused to be shown in the user interface.

42. The one or more non-transitory machine readable media of claim 25, including storing a copy of a rule and automatically naming the copy of the rule based on an updated stage associated with the rule.

43. One or more non-transitory machine readable media for managing one or more data objects stored in a data repository and causing display of one or more elements associated with one or more data objects on a graphical user interface, the one or more non-transitory machine readable media storing one or more instructions that are executable by one or more processors to perform operations including:
  receiving a rule specification that specifies one or more rules, each rule including a set of rule cases that compute values for the rule's output depending on the rule's input, each rule case including one or more input relationships in which a rule case is triggered by a given input record if one or more data values of the given input record meet the one or more input relationships;
  causing display of a data object representing a first version of the one or more rules;
  associating the first version of the one or more rules with a first stage of a plurality of stages;
  causing display of a first set of one or more input elements representing one or more transitions of the first version of the one or more rules from a current stage to another stage among the plurality of stages;
  in response to user input selecting one of the first set of one or more displayed input elements, associating the first version of the one or more rules with a second stage of the plurality of stages;
  generating a second version of the one or more rules;
  causing display of a second set of one or more input elements representing one or more transitions of the second version of the one or more rules from a current stage to another stage among the plurality of stages;
  in response to user input selecting one of the second set of one or more displayed input elements, associating the second version of the one or more rules with a third stage of the plurality of stages, in which the third stage is different from the second stage;
  enabling access to the first version of the one or more rules in the second stage; associating an application program with the first version of the one or more rules in the second stage;
  executing the application program to process one or more input records and to produce one or more first outputs according to one or more rules of the first version of the one or more rules in the second stage;
  enabling access to the second version of the one or more rules in the third stage; associating the application program with the second version of the one or more rules in the third stage; and
  executing the application program to process the one or more input records and to produce one or more second outputs according to one or more rules of the second version of the one or more rules in the third stage;
  wherein data for the graphical user interface configures the graphical user interface for the displaying of the input elements, the receiving of the user inputs, the associating of the application program with the one or more rules, and the executing of the application program.

44. The one or more non-transitory machine readable media of claim 43, in which the first set of one or more input elements is the same as the second set of one or more input elements.

45. The one or more non-transitory machine readable media of claim 43, in which the first set of one or more input elements is different from the second set of one or more input elements.

46. The one or more non-transitory machine readable media of claim 43, including causing display of a third set of one or more input elements representing one or more new versions of the one or more rules, and in response to user input selecting one of the third set of one or more input elements, generating the second version of the one or more rules.

47. The one or more non-transitory machine readable media of claim 46, in which causing display of the third set of one or more input elements includes causing display of a first input element representing a new minor version of the one or more rules, and causing display of a second input element representing a new major version of the one or more rules, and the method further includes:
in response to user input selecting the first input element, generating a new minor version of the one or more rules, and
in response to user input selecting the second input element, generating a new major version of the one or more rules.

48. The one or more non-transitory machine readable media of claim 43, wherein causing display of the data object representing the first version of the one or more rules includes displaying the data object representing the first version of the one or more rules;
wherein causing display of the first set of one or more input elements includes displaying the first set of one or more input elements; and
wherein causing display of the second set of one or more input elements includes displaying the second set of one or more input elements.

49. A system for managing one or more data objects stored in a data repository and causing display of one or more elements associated with one or more data objects on a graphical user interface, the system including:
one or more processors; and
one or more non-transitory machine readable media storing one or more instructions that are executable by the one or more processors to perform operations including:
receiving a rule specification that specifies one or more rules, each rule including a set of rule cases that compute values for the rule's output depending on the rule's input, each rule case including one or more input relationships in which a rule case is triggered by a given input record if one or more data values of the given input record meet the one or more input relationships;
causing display of a first data object representing at least one of the one or more rules;
associating the at least one of the one or more rules with a first stage of a plurality of stages;
causing display of one or more input elements based on permitted transitions associated with the at least one of the one or more rules and the first stage, each input element representing a permitted transition of the at least one of the one or more rules from the first stage to a different stage among the plurality of stages;
in response to user input selecting one of the one or more displayed input elements, associating the at least one of the one or more rules with a second stage of the plurality of stages, in which the selected displayed input element represents the transition from the first stage to the second stage;
associating an application program with the at least one of the one or more rules; and
executing the application program to process the input records and produce the outputs according to the at least one of the one or more rules;
wherein data for the graphical user interface configures the graphical user interface to display the one or more input elements, receive the user input, associate the application program with the at least one of the one or more rules, and execute the application program.

50. The system of claim 49, wherein causing display of the first data object representing at least one of the one or more rules includes displaying the first data object representing at least one of the one or more rules; and
wherein causing display of one or more input elements includes displaying one or more input elements.

51. The system of claim 49, in which the plurality of stages includes a plurality of development stages of a development lifecycle.

52. The system of claim 49, in which the plurality of development stages includes at least one of a develop stage or a test stage.

53. The system of claim 49, in which receiving a rule specification includes receiving a spreadsheet having a plurality of rows that correspond to the rule cases.

54. The system of claim 53, in which the spreadsheet includes trigger columns that correspond to data values, and the rule cases include sets of triggering criteria that relate to the data values.

55. The system of claim 54, in which each rule case is configured such that the rule case applies to a given record if one or more data values of that record, for each trigger column in which the rule case has a criterion or criteria, meets the triggering criterion or criteria.

56. The system of claim 55, in which the spreadsheet includes one or more output columns, each output column corresponds to a potential output variable, and a value of the output variable is determined by a cell in the output column, in which the cell is at the row corresponding to the rule case that applies to the given record.

57. The system of claim 56, in which the cell includes at least one of an output value that is assigned to the output variable or an expression that is evaluated to generate the output value.

58. The system of claim 49, in which a rule includes a set of criteria for performing at least one of converting data from one format to another, making determinations about data, or generating new data based on a set of input data.

59. The system of claim 49, in which the rule specification includes a rule specification table having a plurality of rows, each row defining a rule case and specifying a relationship for each of a set of one or more potential inputs.

60. The one system of claim 59, in which at least one of the relationships includes one or more of having a value equal to a threshold, having a value above a threshold, having a value below a threshold, having a value belonging to a set of values, having a value matching a pattern, having a relationship to a value of another input, having a relationship to a value of an output of another rule specification, or having a relationship to a value in a memory.

61. The system of claim 60, in which at least one of the rows also specifies an output including one or more of a combination of values of the inputs, a pre-determined value, or a value computed from one or more of the values of the inputs.

62. The system of claim 49, including converting a rule in the rule specification to one or more logical expressions, compiling the one or more logical expressions into computer-executable code, and incorporating the computer-executable code into the application program.

63. The system of claim 49, including converting the plurality of rule cases to a transform, and associating the transform with a component in a graph-based computation having data processing components connected by linking elements representing data flows.

64. The system of claim 49, in which the permissible transitions include at least one of (i) a rule in an earlier stage in a development lifecycle, relative to one or more other stages in the development lifecycle, can be promoted to a later stage but cannot be further demoted, (ii) the rule that is in neither the earlier stage nor the last stage in the development lifecycle can be promoted to a later stage or demoted to the earlier stage in the development lifecycle, or (iii) the rule in a last stage in the development lifecycle can be demoted to the earlier stage but cannot be further promoted.

65. The system of claim 64, in which causing display of the one or more input elements includes at least one of (i) when a rule is in the earliest stage of the development lifecycle, a first input element for promoting the rule is caused to be shown and no input element for demoting the rule is caused to be shown in the user interface, (ii) when the rule is in neither the earliest nor the last development stage, the first input element for promoting the rule and a second input element for demoting the rule are caused to be shown in the user interface, or (iii) when the rule is in the last development stage, the second input element for demoting the rule is shown and no input element for promoting the rule is caused to be shown in the user interface.

66. The system of claim 49, including storing a copy of a rule and automatically naming the copy of the rule based on an updated stage associated with the rule.

67. A system for managing one or more data objects stored in a data repository and causing display of one or more elements associated with one or more data objects on a graphical user interface, the system including:
one or more processors; and
one or more non-transitory machine readable media storing one or more instructions that are executable by the one or more processors to perform operations including:
receiving a rule specification that specifies one or more rules, each rule including a set of rule cases that compute values for the rule's output depending on the rule's input, each rule case including one or more input relationships in which a rule case is triggered by a given input record if one or more data values of the given input record meet the one or more input relationships;
causing display of a data object representing a first version of the one or more rules;
associating the first version of the one or more rules with a first stage of a plurality of stages;
causing display of a first set of one or more input elements representing one or more transitions of the first version of the one or more rules from a current stage to another stage among the plurality of stages;
in response to user input selecting one of the first set of one or more displayed input elements, associating the first version of the one or more rules with a second stage of the plurality of stages;
generating a second version of the one or more rules;
causing display of a second set of one or more input elements representing one or more transitions of the second version of the one or more rules from a current stage to another stage among the plurality of stages;
in response to user input selecting one of the second set of one or more displayed input elements, associating the second version of the one or more rules with a third stage of the plurality of stages, in which the third stage is different from the second stage;
enabling access to the first version of the one or more rules in the second stage;
associating an application program with the first version of the one or more rules in the second stage;
executing the application program to process one or more input records and to produce one or more first outputs according to one or more rules of the first version of the one or more rules in the second stage;
enabling access to the second version of the one or more rules in the third stage;
associating the application program with the second version of the one or more rules in the third stage; and
executing the application program to process the one or more input records and to produce one or more second outputs according to one or more rules of the second version of the one or more rules in the third stage;
wherein data for the graphical user interface configures the graphical user interface for the displaying of the input elements, the receiving of the user inputs, the associating of the application program with the one or more rules, and the executing of the application program.

68. The system of claim 67, in which the first set of one or more input elements is the same as the second set of one or more input elements.

69. The system of claim 67, in which the first set of one or more input elements is different from the second set of one or more input elements.

70. The system of claim 67, including causing display of a third set of one or more input elements representing one or more new versions of the one or more rules, and in response to user input selecting one of the third set of one or more input elements, generating the second version of the one or more rules.

71. The system of claim 70, in which causing display of the third set of one or more input elements includes causing display of a first input element representing a new minor version of the one or more rules, and causing display of a second input element representing a new major version of the one or more rules, and the method further includes:
in response to user input selecting the first input element, generating a new minor version of the one or more rules, and
in response to user input selecting the second input element, generating a new major version of the one or more rules.

72. The system of claim 67, wherein causing display of the data object representing the first version of the one or more rules includes displaying the data object representing the first version of the one or more rules;

wherein causing display of the first set of one or more input elements includes displaying the first set of one or more input elements; and wherein causing display of the second set of one or more input elements includes displaying the second set of one or more input elements.

* * * * *

UNITED STATES PATENT AND TRADEMARK OFFICE
CERTIFICATE OF CORRECTION

PATENT NO. : 10,997,246 B2  
APPLICATION NO. : 15/936725  
DATED : May 4, 2021  
INVENTOR(S) : Timothy Perkins and Alan Morse Page 1 of 1

It is certified that error appears in the above-identified patent and that said Letters Patent is hereby corrected as shown below:

In the Claims

Column 22, Line 60, Claim 60, before "system", delete "one"

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*